(12) United States Patent
Mehlmann

(10) Patent No.: US 8,835,544 B2
(45) Date of Patent: Sep. 16, 2014

(54) IMPACT RESISTANT ACRYLIC ALLOY

(75) Inventor: Florence Mehlmann, King of Prussia, PA (US)

(73) Assignee: Arkema France, Colombes (FR)

( * ) Notice: Subject to any disclaimer, the term of this patent is extended or adjusted under 35 U.S.C. 154(b) by 114 days.

(21) Appl. No.: 13/390,625

(22) PCT Filed: Nov. 5, 2010

(86) PCT No.: PCT/US2010/055592
§ 371 (c)(1),
(2), (4) Date: Mar. 12, 2012

(87) PCT Pub. No.: WO2011/062781
PCT Pub. Date: May 26, 2011

(65) Prior Publication Data
US 2012/0164364 A1   Jun. 28, 2012

Related U.S. Application Data

(60) Provisional application No. 61/261,865, filed on Nov. 17, 2009.

(51) Int. Cl.
| | |
|---|---|
| *C08K 5/00* | (2006.01) |
| *C08L 33/00* | (2006.01) |
| *C08F 265/06* | (2006.01) |
| *C08L 33/12* | (2006.01) |
| *C08L 51/00* | (2006.01) |
| *C08F 285/00* | (2006.01) |
| *C08L 67/02* | (2006.01) |
| *C08L 33/20* | (2006.01) |
| *C08L 31/04* | (2006.01) |
| *C08L 67/04* | (2006.01) |
| *C08L 35/06* | (2006.01) |
| *C08F 220/14* | (2006.01) |

(52) U.S. Cl.
CPC ............... *C08L 33/12* (2013.01); *C08F 265/06* (2013.01); C08L 67/02 (2013.01); C08L 33/20 (2013.01); C08L 31/04 (2013.01); C08L 67/04 (2013.01); C08L 35/06 (2013.01); *C08L 51/003* (2013.01); *C08F 285/00* (2013.01); C08F 220/14 (2013.01)
USPC .......................................... 524/284; 524/523

(58) Field of Classification Search
USPC ......................................................... 524/284
See application file for complete search history.

(56) References Cited

U.S. PATENT DOCUMENTS

| | | |
|---|---|---|
| 4,521,568 A | 6/1985 | Mori et al. |
| 5,283,287 A | 2/1994 | Kim et al. |
| 5,318,737 A | 6/1994 | Trabert et al. |
| 5,346,954 A | 9/1994 | Wu et al. |
| 6,180,750 B1 | 1/2001 | May et al. |
| 7,067,188 B1 | 6/2006 | Yang et al. |
| 7,273,894 B2 | 9/2007 | Shelby et al. |
| 7,282,535 B2 | 10/2007 | Kakeda et al. |
| 7,317,050 B2 | 1/2008 | Destarac et al. |
| 7,589,151 B2 | 9/2009 | Aoki et al. |
| 7,666,946 B2 | 2/2010 | Brake et al. |
| 7,740,952 B2 | 6/2010 | Hausmann et al. |
| 7,799,412 B2 | 9/2010 | Yamamura et al. |
| 2001/0056150 A1 | 12/2001 | Smith et al. |
| 2003/0176541 A1 | 9/2003 | Pixton et al. |
| 2003/0216510 A1* | 11/2003 | Wanat et al. ..................... 525/70 |
| 2005/0221032 A1 | 10/2005 | Yamane et al. |
| 2007/0179218 A1 | 8/2007 | Brake et al. |
| 2007/0276090 A1 | 11/2007 | Aoki et al. |
| 2008/0255295 A1 | 10/2008 | Fraser et al. |
| 2009/0018237 A1* | 1/2009 | Fujii et al. ..................... 523/201 |
| 2009/0030132 A1 | 1/2009 | Kumazawa et al. |
| 2009/0111943 A1 | 4/2009 | Bhat et al. |
| 2009/0130347 A1 | 5/2009 | Nakano |
| 2010/0036047 A1* | 2/2010 | Janowicz et al. ............. 524/556 |
| 2010/0324218 A1* | 12/2010 | Cohen et al. ..................... 525/94 |

FOREIGN PATENT DOCUMENTS

| | | |
|---|---|---|
| JP | 11-279380 | 10/1999 |
| JP | 2000-169659 | 6/2000 |
| JP | 2005-008861 | 1/2005 |
| JP | 2006-111729 | 4/2006 |
| WO | WO2011/062781 | 5/2011 |

* cited by examiner

Primary Examiner — Hui Chin
(74) Attorney, Agent, or Firm — Thomas F. Roland

(57) ABSTRACT

The invention relates to an acrylic polymer, modified with one or more hard core core/shell impact modifier, which is blended with one or more low melt viscosity polymer. The alloy formed by the blend has good impact properties, good melt processability, high modulus, high surface hardness, and excellent resistance to chemical attack.

24 Claims, No Drawings

IMPACT RESISTANT ACRYLIC ALLOY

FIELD OF THE INVENTION

The invention relates to an acrylic polymer, modified with one or more hard-core core/shell impact modifier, which is blended with one or more low melt viscosity polymer. The alloy formed by the blend has good impact properties, good melt processability, high modulus, high surface hardness, and excellent resistance to chemical attack.

BACKGROUND OF THE INVENTION

Acrylic compositions and articles made from them are well known for their clarity, lack of color, surface gloss, excellent processability, good scratch resistance and resistance to UV degradation. They are also well known for their low-impact strength or brittleness. It has become standard practice to incorporate toughening agents or impact modifiers in acrylic formulations to improve their mechanical properties.

One type of polymeric impact modifier is sequentially polymerized acrylic compositions comprising a core layer, one or more intermediate layers, and an outer-stage layer, although there can be some intermingling of the "layers". As described in U.S. Pat. No. 3,661,994, these are known as "core/shell" polymers, where either the core layer or an intermediate layer is made of a rubber polymer, and the outer-stage layer, also known as the shell layer, consists of a glassy polymer that is compatible with the acrylic polymer matrix. In the case of a rubbery core layer, the impact modifiers typically suffer from relatively low modulus and relatively poor UV resistance, which is detrimental to the impact modified acrylic formulation. As described in U.S. Pat. No. 4,521,568 and US2003/0216510, core/shell polymers consisting of a hard glassy core layer, and one or more rubber intermediate layers are more desirable to impact modify an acrylic polymer while retaining high modulus and good UV resistance.

Impact modified acrylic resin formulations are well known. A problem with impact modified acrylic resin formulations is that the addition of the core/shell modifiers impairs the melt processability of the polymer matrix by increasing the overall melt viscosity. One known way to improve the melt processability of an impact modified acrylic resin formulation is to decrease the molecular weight of the acrylic polymer matrix, either by using a lower molecular weight acrylic polymer or by incorporating low molecular weight acrylic polymer additives. However, this approach typically degrades other physical properties of the final resin formulation, such as its resistance to chemical attack. There is a desire to improve the melt processibility of impact modified acrylic resin formulations, with little or no degradation of other physical properties.

Surprisingly it has been found that the addition of specific low melt viscosity polymers that are miscible, semi-miscible, or compatible with acrylic polymers, increase the melt processibility of an impact modified acrylic resin, while retaining or improving other physical properties, such as resistance to chemical attack. Polylactic acid is one example of such low melt viscosity polymers. Hard-core core/shell impact modifiers are the preferred acrylic impact modifier.

Polylactic acid (PLA) has been modified with acrylic polymers to improve the properties of the polylactic acid. US 2007/0179218 describes a blend of PLA with 0.1 to 15% acrylic copolymer, and optionally with a core/shell impact modifier.

A PLA matrix has also been modified with acrylic polymer modifiers to improve the heat resistance, impact resistance, and mechanical properties of PLA. US 2007/0276090, and US 2009/0018237 describe a blend of PLA matrix, acrylic polymer and a core/shell impact modifier having a soft core layer. Unfortunately soft-core core/shell impact modifiers suffer from relatively low modulus and relatively poor UV resistance, and therefore their use as an impact modifier significantly decreases the overall modulus and weatherability of the product, much more than that of a hard-core core/shell impact modifier.

SUMMARY OF THE INVENTION

The invention relates to an impact-modified acrylic alloy composition comprising:
  a) 100 parts of an impact-modified acrylic resin containing 15 to 95 weight percent acrylic polymer and 85 to 5 weight percent of one or more core/shell impact modifiers having a core layer and one or more shell layers with a Tg of greater than 0° C., and one or more elastomeric intermediate layers with a Tg of less than 0° C.
  b) 5 to 150 parts of one or more low melt viscosity polymer; wherein the weight percent of impact modifier in the alloy composition is from 5 to 60 weight percent.

The invention further relates to a method for reducing the melt flow viscosity of impact modified acrylic resin comprising the step of admixing from 5 to 60 weight percent of one or more low melt viscosity polymers, based on the overall alloy composition. Preferably the impact modifier is a hard-core core/shell impact modifier.

DETAILED DESCRIPTION OF THE INVENTION

The invention relates to an impact modified acrylic resin composition containing one or more low melt viscosity polymer that is compatible, semi-compatible, or miscible with the acrylic polymer. The impact modifiers of the invention have a core/shell structure with a hard core layer. The composition has good impact properties, good melt processability, high modulus, high surface hardness, and excellent resistance to chemical attack.

Impact Modified Acrylic Resin

The alloy composition of the invention is made up of greater than 40 weight percent of an impact modified acrylic resin, preferably greater than 70 weight percent, and more preferably greater than 80 weight percent. The level of impact modifier in the impact modified acrylic resin is from 5 to 85 percent by weight, and preferably from 10 to 50 percent by weight.

"Acrylic polymer", as used herein is meant to include polymers, copolymers and terpolymers formed from alkyl methacrylate and alkyl acrylate monomers, and mixtures thereof. The alkyl methacrylate monomer is preferably methyl methacrylate, which may Make up from 50 to 100 percent of the monomer mixture. 0 to 50 percent of other acrylate and methacrylate monomers or other ethylenically unsaturated monomers, included but not limited to, styrene, alpha methyl styrene, acrylonitrile, and crosslinkers at low levels may also be present in the monomer mixture. Other methacrylate and acrylate monomers useful in the monomer mixture include, but are not limited to, methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl (meth)acrylic acids such as methacrylic acid and acrylic acid can be useful for the monomer mixture. Most preferably the acrylic polymer is a copolymer having 70-99.5 weight percent of methyl methacrylate units and from 0.5 to 30 weight percent of one or more $C_{1-8}$ straight or branched alkyl acrylate units.

In one embodiment, the acrylic polymer has a weight average molecular weight of between 50,000 and 500,000 g/mol, and preferably from 75,000 and 150,000, as measured by gel permeation chromatography. The molecular weight distribution of the acrylic polymer is monomodal or multimodal and the polydispersity index is higher than 1.5.

In another embodiment, the acrylic polymer has a weight average molecular weight higher than 500,000 g/mol, and preferably higher than 1,000,000 g/mol, as measured by gel permeation chromatography. The molecular weight distribution of the acrylic polymer is monomodal or multimodal and the polydispersity index is higher than 4.

In another embodiment, the acrylic polymer comprises a blend of two or more of the polymers described in the above two embodiments.

In another embodiment, a portion of the acrylic polymer is cross-linked into polymeric particles with a particle size between 0.5 microns and 1,000 microns.

Low Melt Viscosity Polymer

The low melt viscosity polymer in the alloy composition must be compatible, semi-miscible, or miscible with the acrylic polymer of the alloy composition. The low melt viscosity polymer and acrylic polymer should be capable of being blended in a ratio such that a single intimate mixture is generated without separation into distinct bulk phases. "Low melt viscosity polymer", as used herein means polymers having a melt flow rate of more than 10 g/10 minutes as measured by ASTM D1238 at 230° C./10.4 kg of force.

The low melt viscosity polymer of the invention does not include acrylic polymers. The low melt viscosity polymer of this invention includes polyesters, cellulosic esters, polyethylene oxide, polypropylene glycol, polyethylene glycol, polypropylene glycol, styrene-acrylonitrile copolymers, polyvinyl chloride, polyvinyl acetate, polyvinyl alcohol, ethylene-vinyl acetate copolymers, olefin-acrylate copolymers, olefin-acrylate-maleic anhydride copolymers, and maleic anhydride-styrene-vinyl acetate copolymers Useful polyesters include, but are not limited to: poly(butylene terephthalate), poly(ethylene terephthalate), polyethylene terephthalate glycol, polylactic acid. A preferred polyester is polylactic acid.

Useful cellulosic esters include, but are not limited to: cellulose acetate, cellulose triacetate, cellulose propionate, cellulose acetate propionate, cellulose acetate butyrate, and cellulose acetate phthalate.

In one embodiment, the low melt viscosity polymer has a weight average molecular weight higher than the entanglement molecular weight of that polymer, as measured by gel permeation chromatography.

In another embodiment, the water solubility of the low melt viscosity polymer is lower than that of the acrylic polymer of the invention.

The low melt viscosity polymer of the invention makes up from 5 to 60 weight percent of the total alloy composition, preferably from 9 to 40 weight percent.

Impact Modifier

The impact modifier of the invention is a multi-stage, sequentially-produced polymer having a core/shell particle structure of at least three layers made of a hard core layer, one or more intermediate elastomeric layers, and a hard shell layer. The presence of a hard core layer provides a desirable balance of good impact strength, high modulus, and excellent UV resistance, not achieved with a core/shell modifier that possesses a soft-core layer. The impact modifier is present in the alloy composition at a level of from 5 to 60 weight percent, preferably 10 to 45, and more preferably from 20 to 40 weight percent, based on the overall composition.

The hard core layer (Tg>0° C., preferably Tg>20° C.) is typically a single composition polymer, but can also include the combination of a small amount of a low Tg seed on which the hard core layer is formed. For example, a small 5% rubber core seed that becomes dispersed into a hard core layer would be included in the invention as a hard core layer, as long as the combination behaves as a hard core layer. The hard core layer can be chosen from any thermoplastic meeting the Tg requirements. Preferably, the hard core layer is composed primarily of methacrylate ester units, acrylate ester units, styrenic units, or a mixture thereof. Methacrylate esters units include, but are not limited to, methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate and 2-methoxyethyl methacrylate. Acrylate ester units include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate. Preferably the acrylate ester units are chosen from methyl acrylate, ethyl acrylate, n-butyl acrylate, 2-ethylhexyl acrylate and octyl acrylate. Styrenics units include styrene, and derivatives thereof such as, but not limited to, alpha-methyl styrene, and para methyl styrene. In one embodiment the hard-core layer is all-acrylic.

The intermediate layer or layers are elastomeric, having a Tg of less than 0° C., and preferably less than −20° C. Preferred elastomers include polymers and copolymers of alkyl acrylates, dienes, styrenics, and mixtures thereof. Preferably the soft intermediate layer is composed mainly of acrylate ester units. Acrylate ester units useful in forming the soft block include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate. Preferably the acrylate ester units are chosen from methyl acrylate, ethyl acrylate, n-butyl acrylate, 2-ethylhexyl acrylate and octyl acrylate. Useful dienes include, but are not limited to isoprene and butadiene. Useful styrenics include, but are not limited to alpha-methyl styrene, and para methyl styrene.

The shell layer can be made of one or more shell layers, having a Tg>0° C., more preferably Tg>20° C. The shell layer may be the same or different composition from the hard core layer.

Preferably the multi-stage polymer is a three stage composition wherein the stages are present in ranges of 10 to 40 percent by weight, preferably 10 to 20 percent, of the first stage (a), 40 to 70 percent, preferably 50 to 60, of the second intermediate stage (b), and 10 to 50 percent, preferably 20 to 40, of the final stage (c), all percentages based on the total weight of the three-stage polymer particle.

In one embodiment the core layer is a crosslinked polymethylmethacrylate-ethylacrylate copolymer, the middle layer is a crosslinked polybutylacrylate-styrene copolymer, and the outer shell is a polymethylmethacrylate-ethylacrylate copolymer.

The multi-stage polymer can be produced by any known technique for preparing multiple-stage, sequentially-produced polymers, for example, by emulsion polymerizing a subsequent stage mixture of monomers in the presence of a previously formed polymeric product. In this specification, the term "sequentially emulsion polymerized" or "sequentially emulsion produced" refers to polymers which are prepared in aqueous dispersion or emulsion and in which successive monomer charges are polymerized onto or in the presence of a preformed latex prepared by the polymerization of a prior monomer charge and stage. In this type of polymerization, the succeeding stage is attached to and intimately associated with the preceding stage.

In a preferred embodiment the refractive index of the core/shell particle matches the total refractive index of the matrix made of the acrylic polymer and the low melt viscosity polymer. By match is meant that the refractive index of the core/shell particle should be within 0.03 units of the matrix polymer blend, and preferably within 0.02 units.

The impact-modified acrylic resin may further contain other additives typically present in acrylic formulations, including but not limited to, stabilizers, plasticizers, fillers, coloring agents, pigments, antioxidants, antistatic agents, surfactants, toner, refractive index matching additives, additives with specific light diffraction or light reflection characteristics, and dispersing aids.

In one embodiment, an additive is provided to help prevent degradation of the alloy upon exposure to radiation, such as high levels of UV radiation or gamma radiation. Useful radiation stabilizers include, but are not limited to Poly(ethylene glycol), Poly(propylene glycol), butyl lactate, and carboxylic acids such as lactic acid, oxalic acid, acetic acid, or a mixture thereof.

In another embodiment, an additive is provided to achieve specific light manipulation of the alloy with specific light diffraction or light reflection characteristics. Useful additives include, but are not limited to polymeric or inorganic spherical particles with a particle size between 0.5 microns and 1,000 microns. In a preferred embodiment, the additive's refractive index is different from that of the matrix polymer, in order to achieve a haze higher than 10%.

Alloy

The acrylic polymer, low melt viscosity polymer, and core/shell impact modifier can be blended in any order, and by any means known in the art. For example, the components can be dry-blended prior to being melted, or directly melt blended together, such as in an extruder, or intimately mixed in a suitable solvent.

Properties

The composition has good impact properties, good melt processability, high modulus, high surface hardness, and excellent resistance to chemical attack. These properties make the composition excellent for melt processing of articles by typical methods, such as extrusion, blow-molding, injection molding, or thermoforming into sheets, films, rods, pipes, profiles or final objects. These can be used in many applications, such as in automotive, medical devices, surface products, lighting, electronics, optical displays, optical lenses, solar panels, transfer of various fluids (e.g. water- and non water-based, solutions of bio-based materials), military and security/defense applications, consumer and household product housings, appliances, shelves, POP displays, wall coverings, packaging applications (e.g. tamper resistant products, containers such as cosmetic containers). The composition can also be extruded or electro-spun into fibers for applications such as textiles, optical fibers, and light manipulation. The composition can also be used as a component of a solution-based formulation (e.g. as a binder in coatings).

The addition of the low melt viscosity polymer to the impact modified acrylic resin increases the melt flow rate of the alloy composition, with little or no detrimental effect on physical properties, such as mechanical properties and chemical resistance of the impact modified acrylic resin. In some cases, the addition of the low melt viscosity polymer to the impact modifier acrylic polymer improves some physical properties, such as impact strength. Under ASTM D1238 at 230° C./10.4 kg of force, the melt flow rate of the alloy with the low melt viscosity polymer is at least 10 percent higher, preferably at least 20 percent higher, and more preferably at least 30 percent higher than that of the impact modified acrylic that is not modified with the low melt viscosity polymer.

Compared to the use of a low melt viscosity acrylic polymer, the addition of the low melt viscosity polymer of this invention to the impact modified acrylic resin increases the chemical resistance, for instance to alcohols and lipids. The resistance to alcohols and lipids of the impact modified acrylic alloy of the invention, as measured by ASTM D543-Practice B, is at least 10 percent greater than that of the same composition where the low melt viscosity polymer of the invention is replaced by a low melt viscosity acrylic polymer.

EXAMPLES

Example 1

Three materials were prepared by melt extrusion. Material FM1 was a copolymer of 97 weight percent methyl methacrylate and 3 weight percent ethyl acrylate with a weight average molecular weight of 150,000 g/mol. Material FM2 was made of 60 parts by weight of Material 1 and 40 parts by weight of a core-shell impact modifier (four-layer structure containing a hard core layer). Material FM3 was similar to material 2, where 13 wt % of the poly(methyl methacrylate) component was replaced by a Poly(lactic acid) component, having a weight average molecular weight of 220,000 g/mol and a crystallinity of 20%. The melt viscosity of the materials was determined by measuring the melt flow rate (MFR) of the materials according to ASTM 1238. The data shows that the addition of a core-shell impact modifier to a PMMA copolymer decreased the melt flow rate and therefore impaired the melt processability of the resin. However, the use of polylactic acid as an additive to the impact-modified acrylic resin significantly increased the melt flow rate. The mechanical strength of the materials was also measured and showed that the addition of polylactic acid to the impact-modified acrylic resin did not negatively affect the mechanical strength of the material.

TABLE 1

| Material | MFR at 230° C./10.4 kg (g/10 minutes) | Notched izod at 23° C. (ft-lb/in of notch) |
|---|---|---|
| FM1 | 4.5 | 0.3 |
| FM2 | 1.75 | 1.45 |
| FM3 | 3.10 | 1.59 |

Example 2

Two materials were prepared by melt extrusion and molded into plastic plaques with a 0.125 inch thickness. The first material was Material FM3 from example 1. The second material, FM4, was the same formulation as material FM3, further containing 0.5% butyl lactate. The plastic plaques were exposed to 40 kGrays of gamma radiation and the yellowness index of the parts was measured before and after gamma radiation. As shown in Table 2, the presence of butyl lactate in the material significantly reduced yellowing upon exposure to gamma radiation.

TABLE 2

| Material | Yellowness index before gamma radiation | Yellowness index after gamma radiation |
|---|---|---|
| FM3 | 0.6 | 10.25 |
| FM4 | 0.6 | 3.56 |

Example 3

Two materials were prepared by melt extrusion. Material FM5 was a blend consisting of 50 parts by weight of a copolymer of 97 weight percent methyl methacrylate and 3 weight percent ethyl acrylate with a weight average molecular weight of 150,000 g/mol, 40 parts by weight of a core-shell impact modifier (four-layer structure containing a hard core layer), and 10 parts by weight of a Poly(lactic acid) homopolymer having a weight average molecular weight of 220,000 g/mol and a crystallinity of 20%. Material FM6 was similar to material FM5, where the 10 parts by weight of Poly(lactic acid) were displaced by 10 parts by weight of a copolymer of 69 weight percent of methyl methacrylate and 31 weight percent of butyl methacrylate with a weight average molecular weight of 43,000 g/mol (reference from prior art—comparative). The resistance of the two materials to 70% aqueous isopropyl alcohol was measured according to ASTM D543-Procedure B. Tensile bars were annealed, conditioned, exposed to the chemical (wet patch method) for 6 hours under 0.75% constant strain. The retention of tensile elongation at break was measured and reported. As shown in Table 3, the retention of mechanical strength of material FM5 was 35% higher than that of material FM6.

TABLE 3

| Material | Tensile elongation at break before exposure | Tensile elongation at break after exposure | Retention of tensile elongation at break after exposure |
|---|---|---|---|
| FM5 | 47% | 34% | 72% |
| FM6 | 39% | 14.5% | 37% |

Example 4

Two core-shell impact modifiers were made by multi-step emulsion polymerization and spray-dried into a powder. Modifier 1 (of the invention) was a four-layer hard-core core/shell particle, the core layer was composed of PMMA, two intermediate shell-layers were made of polybutyl acrylate and an outer-shell was made of PMMA. Modifier 2 (reference from prior art—comparative) was a two-layer soft core core/shell particle, the core layer was made of polybutyl acrylate and the shell was made of PMMA.

40 parts of modifier 1 or modifier 2 were melt blended 50 parts of Poly(methyl methacrylate) and 10 parts of Poly(lactic acid) to produce impact-modified resins FM7 or FM8. The poly(methyl methacrylate) was a copolymer of 97 weight percent methyl methacrylate and 3 weight percent ethyl acrylate having a weight average molecular weight of 150,000 g/mol. The poly(lactic acid) was a homopolymer having a weight average molecular weight of 220,000 g/mol and a crystallinity of 20%. As shown in Table 4, the use of a soft core core/shell impact modifier (Modifier 2) led to a significantly lower tensile modulus of the product, compared to the use of a hard core core/shell impact modifier (Modifier 1).

TABLE 4

| Material | Modifier | Tensile modulus (psi) |
|---|---|---|
| FM7 | Modifier 1 (hard core layer) | 230,000 |
| FM8 | Modifier 2 (soft core layer) | 170,000 |

What is claimed is:

1. An impact-modified acrylic alloy composition comprising:
   a) 100 parts of an impact-modified acrylic resin composition containing 15 to 95 weight percent acrylic polymer and 85 to 5 weight percent of one or more core/shell impact modifiers having a core layer and one or more shell layers with a Tg of greater than 0° C., and one or more elastomeric intermediate layers having a Tg of less than 0° C.,
   b) 5 to 150 parts of one or more low melt viscosity polymers that are compatible with the acrylic polymer, wherein said low melt viscosity polymers have a melt flow rate of more than 10 g/10 minutes as measured by ASTM D1238 at 230° C./10.4 kg of force, and wherein the low melt viscosity polymer comprises at least one polymer selected from the group consisting of poly(ethylene glycol), poly(propylene gycol), poly(vinyl acetate), poly(vinyl alcohol), poly(vinyl chloride), maleic anhydride-strene-vinyl acetate copolymers, ethylene-vinyl acetate copolymers, styrene-acrylonitrile copolymers, olefin-(meth)acrylate copolymers, olefin-(meth)acrylate-maleic anhydride copolymers, cellulose acetate, cellulose triacetate, cellulose propionate, cellulose acetate propionate, cellulose acetate butyrate, and cellulose acetate phthalate;
wherein the weight percent of impact modifier in the alloy composition is from 5 to 60 weight percent.

2. The impact-modified acrylic alloy composition of claim 1, wherein said acrylic polymer comprises from 50 to 100 weight percent of methylmethacrylate monomer units.

3. The impact-modified acrylic alloy composition of claim 1, wherein said acrylic polymer comprises from 70 to 99.5 weight percent of methylmethacrylate monomer units, and from 0.5 to 30 weight percent of one or more $C_{1-8}$ alkyl acrylate monomer units.

4. The impact-modified acrylic alloy composition of claim 1, wherein said acrylic polymer has a weight average molecular weight greater than 500,000 g/mol.

5. The impact-modified acrylic alloy composition of claim 1, wherein said acrylic polymer has a monomodal or multimodal molecular weight distribution with a polydispersity index greater than 1.5.

6. The impact-modified acrylic alloy composition of claim 1, wherein a portion of said acrylic polymer is cross-linked into polymeric particles with a particle size between 0.5 microns and 1,000 microns.

7. The impact-modified acrylic alloy composition of claim 1, wherein said low melt viscosity polymer comprises from 9 to 40 weight percent of said composition.

8. The impact-modified acrylic alloy composition of claim 1, wherein said low melt viscosity polymer comprises at least one polymer selected from the group consisting of poly(butylene terephthalate), poly(ethylene terephthalate), poly(ethylene terephthalate glycol), and polylactic acid.

9. The impact-modified acrylic alloy composition of claim 8, wherein said low melt viscosity polymer comprises polylactic acid.

10. The impact-modified acrylic alloy composition of claim 1, wherein said low melt viscosity polymer comprises at least one polymer selected from the group consisting of poly(ethylene oxide), poly(elthylene glycol), poly(propylene oxide), and poly(propylene glycol).

11. The impact-modified acrylic alloy composition of claim 1, wherein said low melt viscosity polymer comprises at least one polymer selected from the group consisting of poly(vinyl acetate), poly(vinyl alcohol), poly(vinyl chloride), maleic anhydride-styrene-vinyl acetate copolymers, eth le:lie-vinyl acetate copolymers, and styrene-acrylonitrile copolymers.

12. The impact-modified acrylic alloy composition of claim 1, wherein said low melt viscosity polymer comprises at least one polymer selected from the group consisting of olefin(meth)acrylate copolymers and olefin-(meth)acrylate-maleic anhydride copolymers.

13. The impact-modified acrylic alloy composition of claim 1, wherein said low melt viscosity polymer comprises at least one polymer selected from the group consisting of cellulose acetate, cellulose triacetate, cellulose propionate, cellulose acetate propionate, cellulose acetate butyrate, and cellulose acetate phthalate.

14. The impact-modified acrylic alloy composition of claim 1, wherein said acrylic polymer comprises an acrylic polymer with a weight average molecular weight greater than 500,000 g/mol as measured by gel permeation chromatography, and wherein said low melt viscosity polymer comprises polylactic acid.

15. The impact-modified acrylic alloy composition of claim 1, wherein said core/shell polymer comprises a core layer and a shell layer having a Tg of greater than 20° C., and an intermediate elastomeric layer having a Tg of less than −20° C.

16. The impact modified acrylic alloy composition of claim 1, wherein the melt flow rate at 230° C. under 10.4 kg of force is at least 10 percent greater than for the same composition without the low melt viscosity polymer under the same conditions.

17. The impact modified acrylic alloy composition of claim 1, wherein the light transmittance is greater than 80%, and where the transmission haze is lower than 10%, as measured by ASTM D1003.

18. The impact modified acrylic alloy composition of claim 1, wherein the resistance to alcohols and lipids, as measured by ASTM D543-Practice B, is at least 10percent greater than that of the same composition where the low melt viscosity polymer of this invention is replaced by a low melt viscosity acrylic copolymer.

19. The impact modified acrylic alloy composition of claim 1, further comprising additives selected from the group consisting of stabilizers, plasticizers, fillers, coloring agents, pigments, antioxidants, antistatic agents, surfactants, toner, refractive index matching additives, additives with specific light diffraction or light reflection characteristics, and dispersing aids.

20. The impact modified acrylic alloy composition of claim 19 wherein said stabilizer is a radiation stabilizer, selected from the group consisting of poly(ethylene glycol), poly(propylene glycol), butyl lactate, carboxylic acids, lactic acid, oxalic acid, acetic acid, and mixtures thereof.

21. The impact modified acrylic alloy composition of claim 19 wherein said additive with specific light diffraction or light reflection characteristics is a polymeric spherical particle with a particle size between 0.5 microns and 1,000 microns.

22. An article comprising the impact-modified acrylic alloy composition of claim 1.

23. The article of claim 22, wherein said article comprises a sheet, a film, a rod, a profile, a pipe, an automotive part, a medical device, a protective cap layer, a lighting product, an electronic device, solar panels, an optical lens, fluid transfer device, consumer product housing, wall covering, packing material or container, an electro-spun into fiber or a binder in coatings.

24. An impact-modified acrylic alloy composition comprising:
    a) 100 parts of an impact-modified acrylic resin composition containing 15 to 95 weight percent acrylic polymer and 85 to 5 weight percent of one or more core/shell impact modifiers having a core layer and one or more shell layers with a Tg of greater than 0° C., and one or more elastomeric intermediate layers having a Tg of less than 0° C.,
    b) 5 to 150 parts of one or more low melt viscosity polymers that are compatible with the acrylic polymer, wherein said low melt viscosity polymers have a melt flow rate of more than 10 g/10 minutes as measured by ASTM D1238 at 230° C/10.4 kg of force, wherein the low melt viscosity polymer comprises at least one polymer selected from the group consisting of poly(butylene terephthalate), poly(ethylene terephthalate), and polylactic acid, and;
wherein the weight percent of impact modifier in the alloy composition is from 5 to 60 weight percent, wherein the resistance of the composition to alcohols and lipids, as measured by ASTM D543-Practice B, is at least 10 percent greater than that of the same composition where the low melt viscosity polymer of this invention is replaced by a low melt viscosity acrylic copolymer.

* * * * *